US011667331B2

(12) United States Patent
Hasegawa et al.

(10) Patent No.: US 11,667,331 B2
(45) Date of Patent: Jun. 6, 2023

(54) VEHICLE BODY

(71) Applicant: Honda Motor Co., Ltd., Tokyo (JP)

(72) Inventors: Atsushi Hasegawa, Saitama (JP); Keiichiro Tsuji, Saitama (JP); Koji Yoshikawa, Saitama (JP); Takayuki Fujii, Saitama (JP); Yusuke Miura, Tokyo (JP); Tomohiro Shimizu, Tokyo (JP); Yumi Saito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 17/199,465

(22) Filed: Mar. 12, 2021

(65) Prior Publication Data

US 2021/0291909 A1    Sep. 23, 2021

(30) Foreign Application Priority Data

Mar. 19, 2020    (JP) .............................. JP2020-049437

(51) Int. Cl.
*B62D 21/15*    (2006.01)
*B62D 25/08*    (2006.01)
*B60R 19/26*    (2006.01)

(52) U.S. Cl.
CPC .......... *B62D 21/152* (2013.01); *B62D 25/08* (2013.01); *B60R 19/26* (2013.01)

(58) Field of Classification Search
CPC ........ B62D 21/152; B62D 25/08; B60R 19/26
USPC ....................... 296/187.11, 187.09
See application file for complete search history.

(56) References Cited

U.S. PATENT DOCUMENTS

| 7,407,192 B2 * | 8/2008 | Yoshimura ........... B62D 21/155 280/124.109 |
| 8,905,415 B2 * | 12/2014 | Takeshita ............. B62D 25/082 280/124.109 |
| 9,403,498 B2 * | 8/2016 | Hoschouer .............. B60R 19/34 |
| 2014/0239671 A1 | 8/2014 | Mori |

(Continued)

FOREIGN PATENT DOCUMENTS

| CN | 101428596 | 5/2009 |
| CN | 106240639 | 12/2016 |
| CN | 107074301 | 8/2017 |

(Continued)

OTHER PUBLICATIONS

"Office Action of China Counterpart Application" with English translation thereof, dated Dec. 28, 2022, p. 1-p. 20.

*Primary Examiner* — Joseph D. Pape
*Assistant Examiner* — Dana D Ivey
(74) *Attorney, Agent, or Firm* — JCIPRNET (57) ABSTRACT

A vehicle body including side is provided. The vehicle body includes left and right side frames that extend in a vehicle body forward-rearward direction and support a collision load acting from the front or the rear, and a coupling member that is joined to open ends of the side frames and restricts displacement between the open ends in a direction in which the open ends are away from each other. The side frame has a plurality of low-strength sections disposed with high-strength sections interposed therebetween in the vehicle body forward-rearward direction and having a lower strength than the high-strength sections in the vehicle body forward-rearward direction. The low-strength section closer to the open end has a lower strength in the forward-rearward direction.

15 Claims, 5 Drawing Sheets

(56) References Cited

U.S. PATENT DOCUMENTS

2016/0121934 A1* 5/2016 Murayama ........... B62D 21/152
296/187.09

FOREIGN PATENT DOCUMENTS

| CN | 107107967 | 8/2017 |
| CN | 109895853 | 6/2019 |
| JP | H05105110 | 4/1993 |
| JP | 2010083455 | 4/2010 |

* cited by examiner

VEHICLE BODY

CROSS-REFERENCE TO RELATED APPLICATION

This application claims the priority of Japan patent application serial no. 2020-049437, filed on Mar. 19, 2020. The entirety of the above-mentioned patent application is hereby incorporated by reference herein and made a part of this specification.

BACKGROUND

Technical Field

The disclosure relates to a vehicle body including left and right side frames that extend in a vehicle body forward-rearward direction and support a collision load acting from the front or the rear, and a coupling member that is joined to open ends of the side frames and restricts displacement between the open ends in a direction in which the open ends are away from each other.

Description of Related Art

Patent Document 1 discloses a front side member including an inner panel extending in a vehicle body forward-rearward direction along a vertical plane and an outer panel joined to the inner panel from an outer side. The outer panel has a side wall which faces an outer surface of the inner panel, an upper wall which is subjected to bending forming toward the inner panel from an upper end of the side wall and bonded to the inner panel, and a lower wall which is subjected to bending forming toward the inner panel from a lower end of the side wall and bonded to the inner panel. A plurality of beads extending in a vertical direction are alternately arrayed in the side walls of the inner panel and the outer panel.

Patent Documents

[Patent Document 1] Japanese Patent Laid-Open No. H5-105110

Beads do not reach ridgelines of an inner panel or an outer panel. Furthermore, the beads are disposed at equal pitches in the inner panel and the outer panel. In such a constitution, when a collision load is applied to a front side frame in a vehicle body forward-rearward direction, even if the front side frame is bent in any one of the beads, bending is unlikely to occur in other beads. As a result, the front side frame cannot be crushed any further than it is in the vehicle body forward-rearward direction. An absorption amount of collision energy is not large.

SUMMARY

According to an embodiment of the disclosure, there is provided a vehicle body including left and right side frames that extend in a vehicle body forward-rearward direction and support a collision load acting from the front or the rear, and a coupling member that is joined to open ends of the side frames and restricts displacement between the open ends in a direction in which the open ends are away from each other. The side frame has a plurality of low-strength sections disposed with high-strength sections interposed therebetween in the vehicle body forward-rearward direction and having a lower strength than the high-strength sections in the vehicle body forward-rearward direction. The low-strength section closer to the open end has a lower strength in the forward-rearward direction.

According to an embodiment, in addition to the constitution of the first aspect, the vehicle body further includes a bumper beam that has an intermediate body linearly extending in a lateral direction from a center in the lateral direction, and inclined bodies respectively connecting the open ends of the side frames to both ends of the intermediate body and inclining in a manner of being away from the open ends as the inclined bodies go toward the intermediate body from the open ends.

According to an embodiment, in addition to the constitution of the first or second aspect, the low-strength sections include a crushing section which is disposed closest to the open end and weakens inner ridgelines and outer ridgelines to have a low strength.

According to an embodiment, in addition to the constitution of the third aspect, low-strength areas weakening the ridgelines to have a low strength are formed of a softer metal plate material than high-strength areas in accordance with temperature control during hot stamp forming.

According to an embodiment, in addition to the constitution of the third or fourth aspect, the crushing section expands from the open end.

According to an embodiment, in addition to the constitution of the third aspect, the low-strength sections include a large crushing section which is disposed away from the crushing section with a gap therebetween in the vehicle body forward-rearward direction and in which a first distortion section weakening the ridgelines on the outer side to have a low strength and a second distortion section weakening the ridgelines on the inner side to have a low strength are alternately arranged in the forward-rearward direction.

According to an embodiment, in addition to the constitution of the sixth aspect, a linear high-strength area inclining and extending in the lateral direction is demarcated between a first one side low-strength area weakening the ridgelines in the first distortion section to have a low strength and a second one side low-strength area weakening the ridgelines in the second distortion section to have a low strength.

According to an embodiment, in addition to the constitution of the seventh aspect, the first one side low-strength area and the second one side low-strength area are formed of a softer metal plate material than high-strength areas in accordance with temperature control during hot stamp forming.

According to an embodiment, in addition to the constitution of any one of the first to eighth aspects, the side frame includes a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other; and an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

According to an embodiment, in addition to the constitution of any one of the sixth to eighth aspects, the side frame has a bead extending in a manner of intersecting the first distortion section and the second distortion section in the vehicle body forward-rearward direction along an axis at a center in a vehicle width direction.

BRIEF DESCRIPTION OF THE DRAWINGS

(A) of FIG. 2 is a cross-sectional view along line 2A-2A in FIG. 1, (B) of FIG. 2 is a cross-sectional view along line 2B-2B in FIG. 1, (C) of FIG. 2 is a cross-sectional view along line 2C-2C in FIG. 1, and (D) of FIG. 2 is a cross-sectional view along line 2D-2D in FIG. 1.

DESCRIPTION OF THE EMBODIMENTS

The disclosure provides a vehicle body including side frames capable of contributing to increase in absorption amount of collision energy.

Hereinafter, embodiments of the disclosure will be described with reference to the accompanying drawings. Here, upward, downward, forward, rearward, leftward, and rightward directions of a vehicle body are stipulated on the basis of a viewpoint of an occupant in a four-wheeled automobile.

Figure 1:
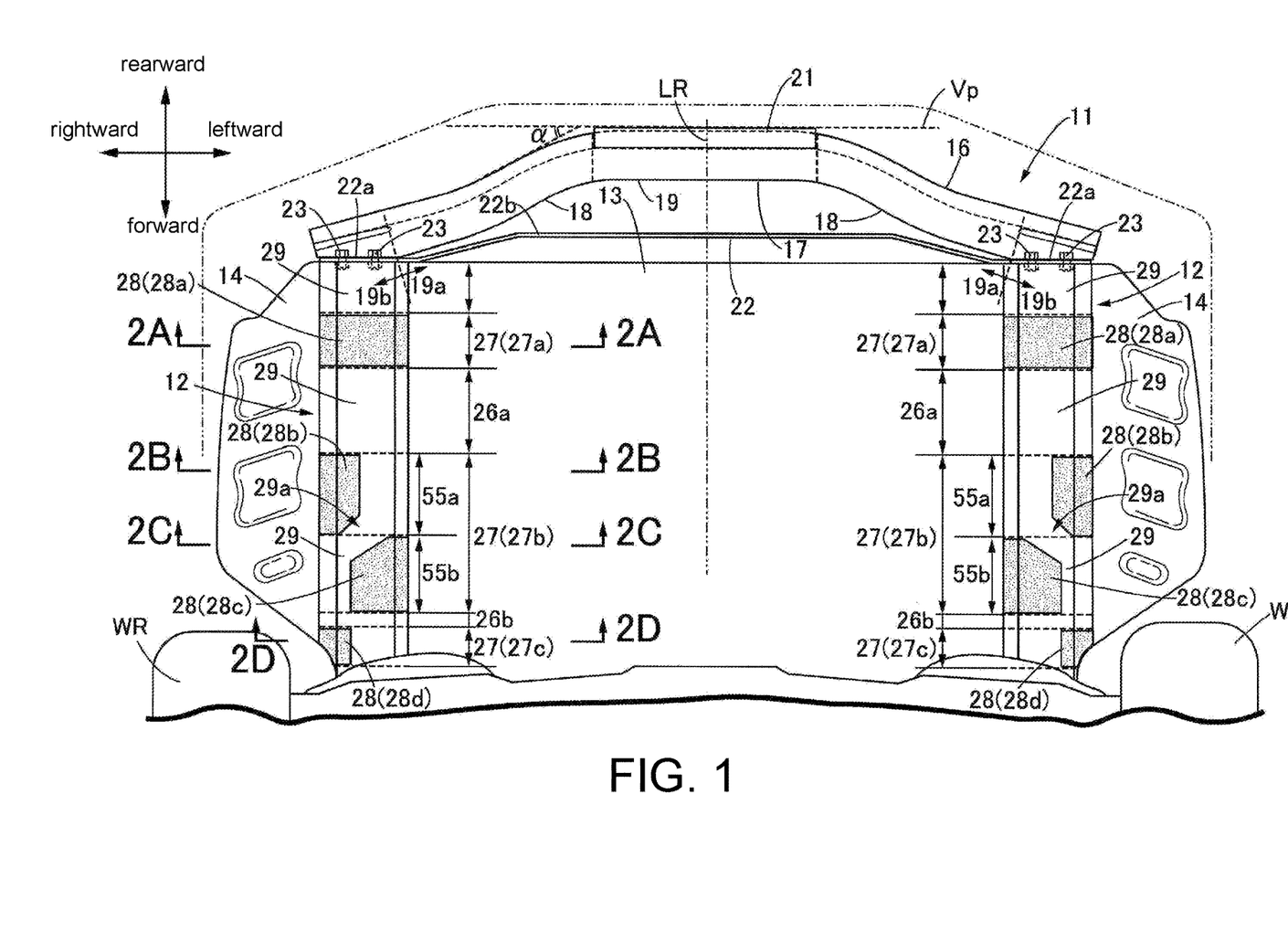
FIG. 1 is a plan view of a structure of a rear part of a vehicle body according to a first embodiment of the disclosure.

FIG. 1 schematically illustrates a structure of a rear part of a vehicle body according to a first embodiment of the disclosure. A vehicle body 11 includes a pair of left and right rear side members (side frames) 12 extending in a vehicle body forward-rearward direction behind rear wheels WR, a floor panel 13 expanding along a horizontal plane between the left and right rear side members 12 and coupling the left and right rear side members 12 to each other, and auxiliary panels 14 respectively joined to the left and right rear side members 12 and expanding outward to the left and the right from the rear side members 12. Each of the rear side members 12 is formed to have a tubular shape exhibiting a high rigidity with respect to a buckling load in a forward-rearward direction. Each of the rear side members 12 supports a collision load from behind in the forward-rearward direction. For example, the rear side members 12 and the floor panel 13 are constituted of an iron plate material (for example, a steel plate) and function as impact absorptive members by being crushed due to a collision load from behind.

The vehicle body 11 further includes a rear bumper beam 16 that extends in a vehicle body lateral direction, is joined to each of the rear side members 12 at both ends, and protrudes rearward as it goes toward the center in the lateral direction. The rear bumper beam 16 has an intermediate body 17 linearly extending in the lateral direction at the center in the lateral direction, and inclined bodies 18 connecting respectively corresponding rear ends (open ends) of the rear side members 12 to both ends of the intermediate body 17 and inclining in a manner of being away from the rear ends of the rear side members 12 as the inclined bodies 18 go toward the intermediate body 17 from the rear ends of the rear side members 12. The rear bumper beam 16 is formed to have a bilaterally symmetrical shape with respect to a bilaterally symmetrical surface LR of the vehicle body. The inclined bodies 18 are formed to have a curved shape which is curved such that they protrude forward at intermediate positions. An opening angle α on a rear surface of the inclined body 18 is set within a range of 30 degrees to 60 degrees with respect to a virtual vertical plane Vp which comes into contact with the intermediate body 17 from behind. Here, the opening angle α indicates an angle of a clearance formed by the rear surface of the inclined body 18 with respect to the virtual vertical plane Vp. The opening angle α can be identified by a linear area of the inclined body 18.

The rear bumper beam 16 includes a beam main body 19 formed using an extrusion-formed body of which an extrusion direction is aligned with the vehicle body lateral direction, and a reinforcing member 21 joined to the beam main body 19 from behind at the intermediate body 17. The extrusion-formed body is formed on the basis of extrusion forming using a steel material or an aluminum alloy material, for example. The beam main body 19 has an original shape area 19a maintaining the cross-sectional shape at the time of extrusion forming, and crushing areas 19b formed using extrusion-formed bodies crushed in the vehicle body forward-rearward direction at both left and right ends of the beam main body 19. The beam main body 19 is joined to each of the rear ends of the rear side members 12 at the crushing areas 19b. During joining, bolts can be used, for example. Due to an effect of the crushing areas 19b, the beam main body 19 can overlap the rear ends of the rear side members 12 in a plane orthogonal to the bilaterally symmetrical surface LR. Further, the rear bumper beam 16 may be formed on the basis of press forming.

The vehicle body 11 further includes a coupling member 22 that is joined to the rear ends of the rear side members 12 and restricts displacement between the rear ends in a direction in which the rear ends are away from each other. The coupling member 22 has left and right fixing pieces 22a bonded to both ends of the rear bumper beam 16 and respectively joined to the corresponding rear ends of the rear side members 12, and a connection body 22b having a distance to the rear from rear ends of the floor panel 13 and connecting the left and right fixing pieces 22a to each other. A particular gap is secured in the vehicle body forward-rearward direction between the connection body 22b and the rear bumper beam 16. For example, the coupling member 22 can be formed of a metal plate (for example, a steel plate) having a uniform thickness. Both ends of the rear bumper beam 16 are welded to the fixing pieces 22a, for example. The fixing pieces 22a are joined to the rear ends of the rear side members 12 using a plurality of bolts 23 disposed above and below in the rear bumper beam 16.

The rear side members 12 have low-strength sections 27 disposed with high-strength sections 26a and 26b interposed therebetween in the vehicle body forward-rearward direction and having a lower strength than the high-strength sections 26a and 26b in the vehicle body forward-rearward direction. The low-strength sections 27 have low-strength areas 28 formed of a softer metal plate material (for example, a steel plate) than high-strength areas 29 in accordance with temperature control during hot stamp forming. During softening of a metal plate material, for example, the high-strength areas 29 are rapidly cooled from a high temperature, whereas the low-strength areas 28 may be cooled from a temperature lower than the heating temperature of the high-strength areas 29. However, during softening of a metal plate material, other temperature control may be used. Further, during softening of a metal plate material, beads extending orthogonal to a crushing direction may be used.

Figure 2:
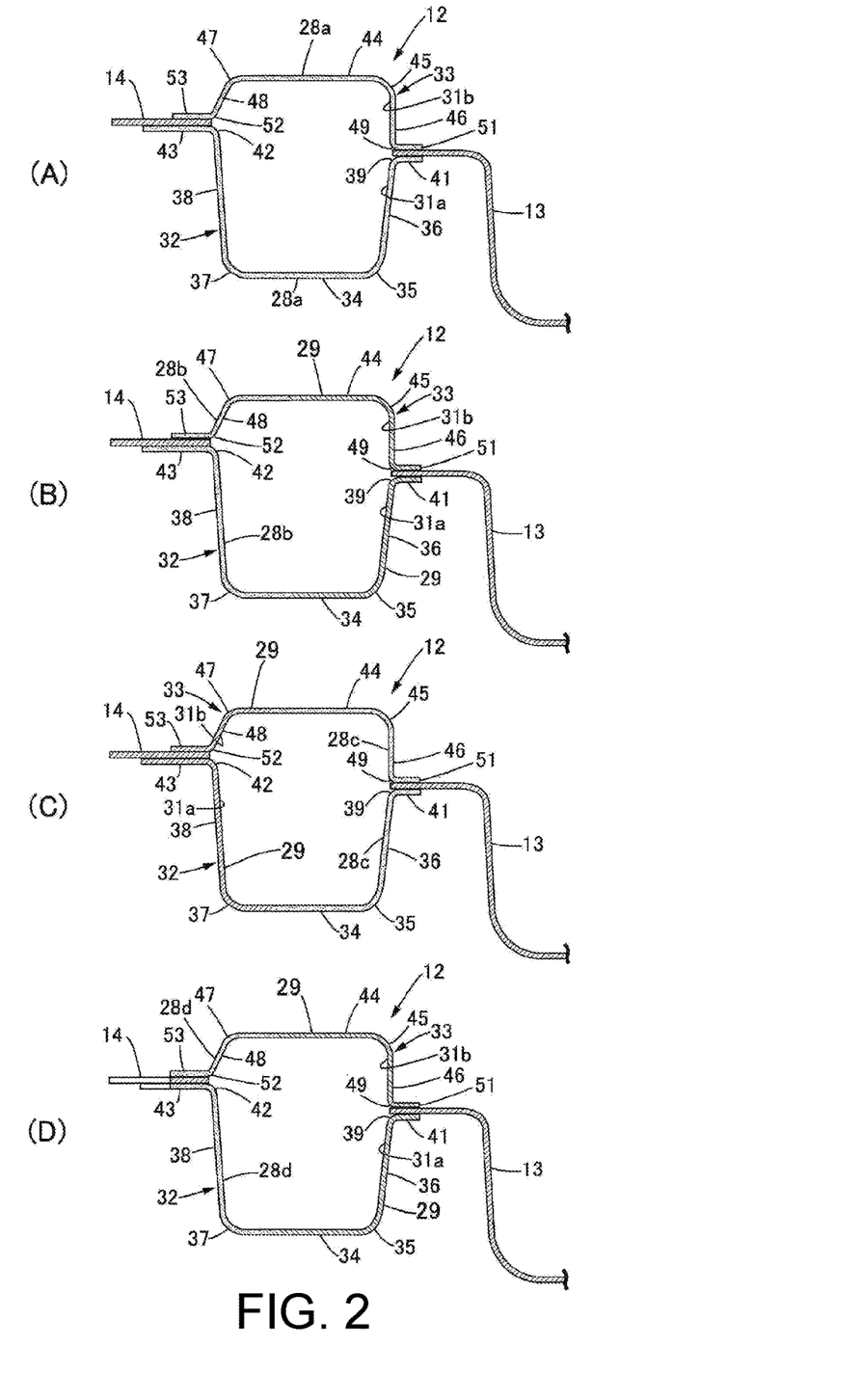

As illustrated in FIG. 2, the rear side member 12 includes a lower member 32 partitioning a linear first space 31a which extends in the vehicle body forward-rearward direction and opens upward, and an upper member 33 joined to the lower member 32 from above and partitioning a second space 31b which extends in the vehicle body forward-rearward direction, opens downward, and is united with the first space 31a. For example, the lower member 32 has a lower wall 34 which extends in the vehicle body forward-rearward direction along a horizontal plane; a first vertical wall 36 which is subjected to bending forming from an inner end of the lower wall 34 (floor panel 13 side end), raised upward, and connected to the inner end of the lower wall 34 at a first inner ridgeline 35 extending in the vehicle body forward-rearward direction; a second vertical wall 38 which is subjected to bending forming from an outer end of the lower wall 34 (auxiliary panel 14 side end), raised upward, and connected to the outer end of the lower wall 34 at a first outer ridgeline 37 extending in the vehicle body forward-rearward direction; an inner first flange 41 which is subjected to bending forming from an upper end of the first vertical wall 36, expands inward in the lateral direction, and is connected to the upper end of the first vertical wall 36 at a second inner ridgeline 39 extending in the vehicle body forward-rearward direction; and an outer first flange 43 which is subjected to bending forming from an upper end of the second vertical wall 38, expands outward in the lateral direction, and is connected to the upper end of the second vertical wall 38 at a second outer ridgeline 42 extending in the vehicle body forward-rearward direction. Here, the inner first flange 41, the first vertical wall 36, the lower wall 34, the second vertical wall 38, and the outer first flange 43 can be formed of one metal plate material. The first space 31a is partitioned using a plate material connecting the inner first flange 41 and the outer first flange 43 to each other.

The upper member 33 has an upper wall 44 which faces the lower wall 34 of the lower member 32 and extends in the vehicle body forward-rearward direction along a horizontal plane; a third vertical wall 46 which is subjected to bending forming from an inner end of the upper wall 44 (floor panel 13 side end), expands downward, and is connected to the inner end of the upper wall 44 at a third inner ridgeline 45 extending in the vehicle body forward-rearward direction; a fourth vertical wall 48 which is subjected to bending forming from an outer end of the upper wall 44 (auxiliary panel 14 side end), expands downward, and is connected to the outer end of the upper wall 44 at a third outer ridgeline 47 extending in the vehicle body forward-rearward direction; an inner second flange 51 which is subjected to bending forming from a lower end of the third vertical wall 46, expands inward in the lateral direction, and is connected to the lower end of the third vertical wall 46 at a fourth inner ridgeline 49 extending in the vehicle body forward-rearward direction; and an outer second flange 53 which is subjected to bending forming from a lower end of the fourth vertical wall 48, expands outward in the lateral direction, and is connected to the lower end of the fourth vertical wall 48 at a fourth outer ridgeline 52 extending in the vehicle body forward-rearward direction. Here, the inner second flange 51, the third vertical wall 46, the upper wall 44, the fourth vertical wall 48, and the outer second flange 53 can be formed of one metal plate material. The second space 31b is partitioned using a plate material connecting the inner second flange 51 and the outer second flange 53 to each other.

The inner second flange 51 overlaps the inner first flange 41 of the lower member 32. An edge of the floor panel 13 is interposed between the inner first flange 41 and the inner second flange 51. The inner first flange 41, the floor panel 13, and the inner second flange 51 are bonded to each other through welding. Further, the edge of the floor panel 13 may overlap the inner second flange 51 overlapping the inner first flange 41 thereon.

The outer second flange 53 overlaps the outer first flange 43 of the lower member 32. An edge of the auxiliary panel 14 is interposed between the outer first flange 43 and the outer second flange 53. The outer first flange 43, the auxiliary panel 14, and the outer second flange 53 are bonded to each other through welding. Further, the edge of the floor panel 13 may overlap the outer second flange 53 overlapping the outer first flange 43 thereon.

The low-strength sections 27 include a crushing section 27a which is disposed closest to the rear end and weaken (less-strengthen) the first inner ridgeline 35, the second inner ridgeline 39, the third inner ridgeline 45, and the fourth inner ridgeline 49 on the inner side, and the first outer ridgeline 37, the second outer ridgeline 42, the third outer ridgeline 47, and the fourth outer ridgeline 52 on the outer side to have a low strength. As illustrated in (A) of FIG. 2, in the crushing section 27a, a first low-strength area 28a continues throughout the whole circumference of the first space 31a and the second space 31b united with each other. The first low-strength area 28a intersects the first inner ridgeline 35, the second inner ridgeline 39, the third inner ridgeline 45, the fourth inner ridgeline 49, the first outer ridgeline 37, the second outer ridgeline 42, the third outer ridgeline 47, and the fourth outer ridgeline 52 throughout the whole area of the crushing section 27a in the vehicle body forward-rearward direction.

In the crushing section 27a, the inner first flange 41 of the lower member 32 and the outer first flange 43 are occupied by the first low-strength area 28a. Similarly, the inner second flange 51 and the outer second flange 53 of the upper member 33 are occupied by the first low-strength area 28a. In the crushing section 27a, the first flanges 41 and 43 formed in the first low-strength area 28a and the second flanges 51 and 53 formed in the first low-strength area 28a overlap and are bonded to each other through welding.

The low-strength sections 27 include a large crushing section 27b which is disposed away from the crushing section 27a with a gap therebetween in the vehicle body forward-rearward direction (toward the front) and in which a first distortion section 55a bent outward and a second distortion section 55b bent inward are alternately arranged in the forward-rearward direction. As illustrated in (B) of FIG. 2, in the first distortion section 55a, a second low-strength area (first one side low-strength area) 28b intersects the first outer ridgeline 37, the second outer ridgeline 42, the third outer ridgeline 47, and the fourth outer ridgeline 52 on the outer side throughout the whole area of the first distortion section 55a in the vehicle body forward-rearward direction. In this manner, the first outer ridgeline 37, the second outer ridgeline 42, the third outer ridgeline 47, and the fourth outer ridgeline 52 are weakened to have a low strength. The high-strength areas 29 are secured in the first inner ridgeline 35, the second inner ridgeline 39, the third inner ridgeline 45, and the fourth inner ridgeline 49 on the inner side. In this manner, since the ridgelines on the inner side maintain a high strength, the first distortion section 55a can be formed to have a higher strength than the crushing section 27a in the vehicle body forward-rearward direction.

In the first distortion section 55a, the outer first flange 43 of the lower member 32 is occupied by the second low-strength area 28b. Similarly, the outer second flange 53 of the upper member 33 is occupied by the second low-strength area 28b. In the first distortion section 55a, the first flange 43 formed in the second low-strength area 28b and the second flange 53 formed in the second low-strength area 28b overlap and are bonded to each other through welding. On the other hand, the inner first flange 41 of the lower member 32 and the inner second flange 51 of the upper member 33 are occupied by the high-strength areas 29.

As illustrated in (C) of FIG. 2, in the second distortion section 55b, a third low-strength area (second one side low-strength area) 28c intersects the first inner ridgeline 35, the second inner ridgeline 39, the third inner ridgeline 45, and the fourth inner ridgeline 49 on the inner side throughout the whole area of the second distortion section in the vehicle body forward-rearward direction. In this manner, the first inner ridgeline 35, the second inner ridgeline 39, the third inner ridgeline 45, and the fourth inner ridgeline 49 are weakened to have a low strength. The high-strength areas 29 are secured in the first outer ridgeline 37, the second outer ridgeline 42, the third outer ridgeline 47, and the fourth outer ridgeline 52 on the outer side. In this manner, since the ridgelines on the outer side maintain a high strength, the second distortion section 55b can be formed to have a higher strength than the crushing section 27a in the vehicle body forward-rearward direction.

In the second distortion section 55b, the inner first flange 41 of the lower member 32 is occupied by the third low-strength area 28c. Similarly, the inner second flange 51 of the upper member 33 is occupied by the third low-strength area 28c. In the second distortion section 55b, the first flanges 41 formed in the third low-strength area 28c and the second flanges 51 formed in the third low-strength area 28c overlap and are bonded to each other through welding. On the other hand, the outer first flange 43 of the lower member 32 and the outer second flange 53 of the upper member 33 are occupied by the high-strength areas 29.

A linear high-strength area 29a inclining and extending in the lateral direction orthogonal to the bilaterally symmetrical surface LR is demarcated between the second low-strength area 28b contributing to weaken the ridgelines to have a low strength in the first distortion section 55a and the third low-strength area 28c contributing to weaken the ridgelines to have a low strength in the second distortion section 55b. In demarcation of the high-strength area 29a, a front end of the second low-strength area 28b is partitioned by a contour (inclined line) displaced rearward as it is away inward from the third outer ridgeline 47 and the first outer ridgeline 37. Similarly, a rear end of the third low-strength area 28c is partitioned by a contour (inclined line) displaced forward as it is away outward from the third inner ridgeline 45 and the first inner ridgeline 35. The inclined line of the second low-strength area 28b and the inclined line of the third low-strength area 28c need only be separated from each other by a certain gap or greater. The inclined line of the second low-strength area 28b and the inclined line of the third low-strength area 28c may extend parallel to each other.

The low-strength sections 27 include a third distortion section 27c which is disposed away from the large crushing section 27b with a gap therebetween in the vehicle body forward-rearward direction (toward the front) and bent outward. The gap between the large crushing section 27b and the third distortion section 27c is set to be smaller than the gap between the crushing section 27a and the large crushing section 27b. As illustrated in (D) of FIG. 2, in the third distortion section 27c, a fourth low-strength area 28d intersects the first outer ridgeline 37, the second outer ridgeline 42, the third outer ridgeline 47, and the fourth outer ridgeline 52 on the outer side throughout the whole area of the third distortion section 27c in the vehicle body forward-rearward direction. In this manner, the first outer ridgeline 37, the second outer ridgeline 42, the third outer ridgeline 47, and the fourth outer ridgeline 52 are weakened to have a low strength. The high-strength areas 29 are secured in the first inner ridgeline 35, the second inner ridgeline 39, the third inner ridgeline 45, and the fourth inner ridgeline 49 on the inner side. Furthermore, the fourth low-strength area 28d is demarcated to be smaller than the second low-strength area 28b and the third low-strength area 28c in the vehicle body forward-rearward direction. At the same time, the fourth low-strength area 28d is demarcated to be smaller than the second low-strength area 28b and the third low-strength area 28c in the vehicle body lateral direction. In this manner, the third distortion section 27c can be formed to have a higher strength than the crushing section 27a and the large crushing section 27b in the vehicle body forward-rearward direction.

Next, operation of the present embodiment will be described. When a collision load acts from behind, the rear ends of the rear side members 12 are restricted by the coupling member 22 in a direction in which they are away from each other. Therefore, applying of a load in the lateral direction to each of the rear side members 12 can be curbed. A collision load acting on each of the rear side members 12 in the forward-rearward direction can be regulated. Furthermore, the low-strength section 27 of the rear side member 12 closer to the rear end of the rear side member 12 has a lower strength in the forward-rearward direction. Therefore, the low-strength sections 27 begin to be crushed from the rear end side in accordance with a load acting in the forward-rearward direction. In this manner, an absorption amount of collision energy absorbed by the rear side members 12 can be increased. An impact of a collision can be favorably absorbed.

In the present embodiment, the rear bumper beam 16 has the intermediate body 17 linearly extending in the lateral direction from the center in the lateral direction, and the inclined bodies 18 respectively connecting the rear ends of the rear side members 12 to both ends of the intermediate body 17 and inclining in a manner of being away from the rear ends of the rear side members 12 as they go toward the intermediate body 17 from the rear ends of the rear side members 12. Therefore, a collision load acts on the rear bumper beam 16 from the intermediate body 17 even at the time of an offset collision. A collision load can be favorably allotted to and dispersed in the left and right rear side members 12 from the rear bumper beam 16. In this manner, an offset collision can be favorably supported by the left and right rear side members 12. At this time, the coupling member 22 prevents the left and right rear side members 12 from being deformed in a direction in which they are away from each other. Therefore, deformation of the rear bumper beam 16 can be curbed.

In the rear side members 12 according to the present embodiment, in the plurality of low-strength sections 27, the crushing section 27a weakening the first inner ridgeline 35, the second inner ridgeline 39, the third inner ridgeline 45, and the fourth inner ridgeline 49 on the inner side, and the first outer ridgeline 37, the second outer ridgeline 42, the third outer ridgeline 47, and the fourth outer ridgeline 52 on the outer side to have a low-strength are disposed at a position closest to the rear end of the rear side member 12. When a collision load acts on the rear side members 12, the low-strength section 27 closest to the rear end of the rear side member 12 can be crushed first in the vehicle body forward-rearward direction. In this manner, if collision energy is absorbed simply through initial crushing, deformation of the vehicle body 11 can be minimized.

In the rear side members 12, the large crushing section 27*b* is disposed away from the crushing section 27*a* with a gap therebetween in the vehicle body forward-rearward direction (toward the front). In the large crushing section 27*b*, the first distortion section 55*a* weakening the first outer ridgeline 37, the second outer ridgeline 42, the third outer ridgeline 47, and the fourth outer ridgeline 52 on the outer side to have a low strength and the second distortion section 55*b* weakening the first inner ridgeline 35, the second inner ridgeline 39, the third inner ridgeline 45, and the fourth inner ridgeline 49 on the inner side to have a low strength are alternately arranged in the forward-rearward direction. At this time, since the ridgelines on the outer side are weakened to have a low strength in the first distortion section 55*a*, the rear side members 12 are distorted outward. Since the ridgelines on the inner side are weaken to have a low strength in the second distortion section 55*b*, the rear side members 12 are distorted inward. The rear side members 12 can be significantly crushed in the vehicle body forward-rearward direction due to a combination of these distortions. An impact of a collision can be significantly absorbed.

Here, the linear high-strength area 29*a* inclining and extending in the lateral direction is demarcated between the second low-strength area 28*b* of the first distortion section 55*a* and the third low-strength area 28*c* of the second distortion section 55*b*. Even if the second low-strength area 28*b* and the third low-strength area 28*c* become close to each other in the forward-rearward direction, the high-strength area 29*a* can be secured. Crushing of the large crushing section 27*b* can be secured. Absorption of a significant impact can be secured. Since the second low-strength area 28*b* and the third low-strength area 28*c* are not integrally crushed, the rear side member 12 can be deformed in order from the rear end without having a lower strength than the low-strength section closer to the rear end.

The first low-strength area 28*a*, the second low-strength area 28*b*, the third low-strength area 28*c*, and the fourth low-strength area 28*d* of the rear side member 12 are formed of a softer metal plate material than the high-strength areas 29 in accordance with temperature control during hot stamp forming. In this manner, the first low-strength area 28*a*, the second low-strength area 28*b*, the third low-strength area 28*c*, and the fourth low-strength area 28*d* can be easily established by simply controlling a temperature for each region of a metal plate material at the time of hot stamp forming. Particularly, in a metal plate material forming the lower member 32 and the upper member 33, at least the first low-strength area 28*a*, the second low-strength area 28*b*, the third low-strength area 28*c*, and the fourth low-strength area 28*d* are partially established in the first flanges 41 and 43 and the second flanges 51 and 53 welded to each other. Therefore, when a collision load acts on the rear side members 12, weld peeling of the first flanges 41 and 43 and the second flanges 51 and 53 can be curbed.

The inventor performed strength analysis of the rear side members 12 on the basis of a computer simulation. As illustrated in (A) of FIG. 3, a model 56 of the rear side member 12 was built in the computer simulation. In the model 56, the high-strength area 29, the crushing section 27*a*, the high-strength area 29, the large crushing section 27*b*, the high-strength area 29, the small crushing section 27*c*, and the high-strength area 29 were set in order from the rear end of the rear side member 12 toward the front. In the crushing section 27*a*, the first low-strength area 28*a* intersecting the ridgelines on the inner side and the ridgelines on the outer side was set. In the large crushing section 27*b*, the first distortion section 55*a* weakening the ridgelines on the inner side to have a low strength in the second low-strength area 28*b* and the second distortion section 55*b* weakening the ridgelines on the outer side to have a low strength in the third low-strength area 28*c* were arranged in the forward-rearward direction. In the small crushing section 27*c*, a third distortion section 55*c* having the fourth low-strength area 28*d* weakening the ridgelines on the inner side to have a low strength was set. The first distortion section 55*a*, the second distortion section 55*b*, and the third distortion section 55*c* were set to have an equivalent strength in the vehicle body forward-rearward direction. A load 57 was applied to the model 56 from the rear end of the rear side member 12 in the forward-rearward direction.

Figure 3:
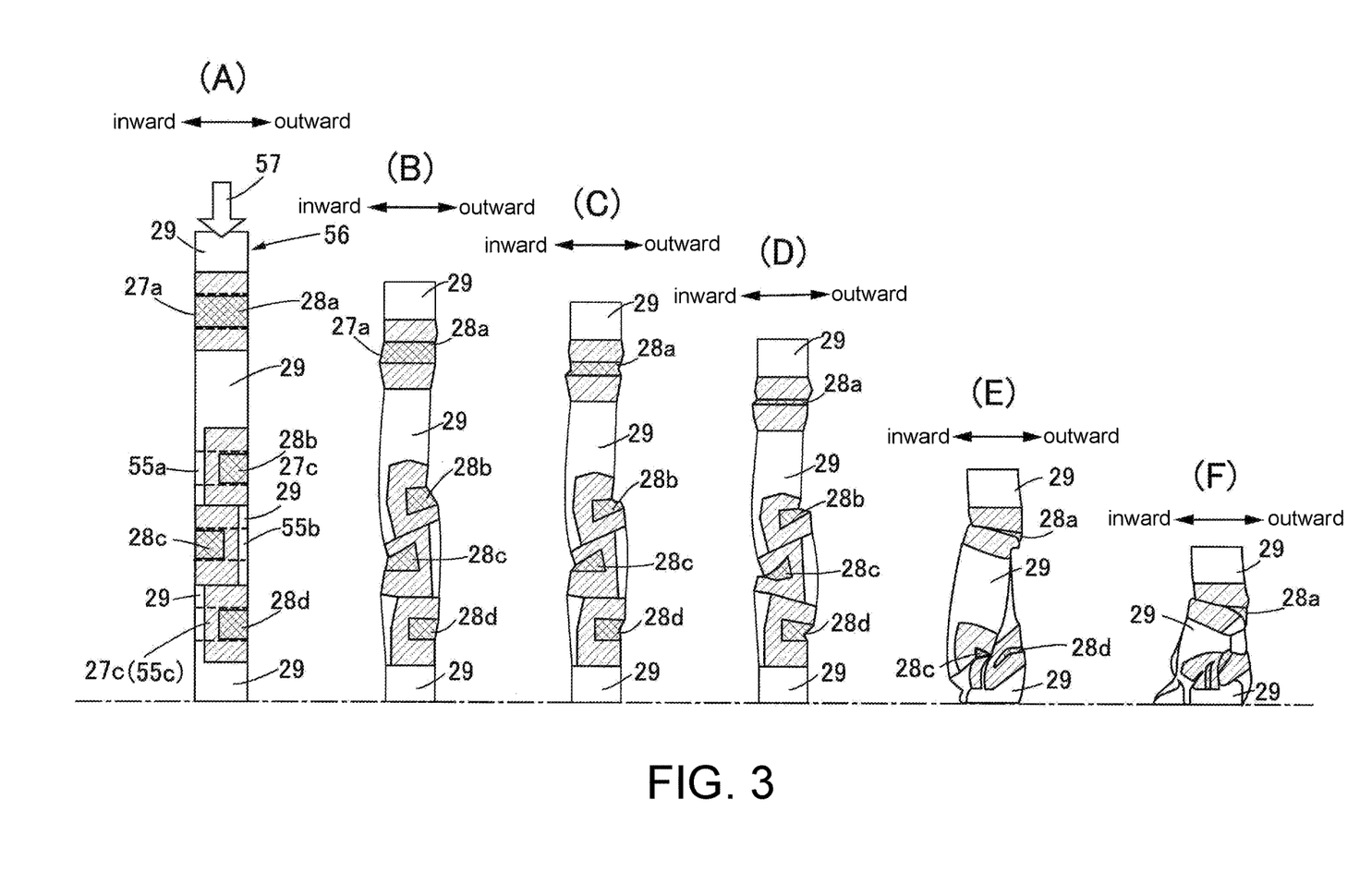
FIG. 3 is a conceptual diagram illustrating states of crushing of a rear side member in a computer simulation.

When the load 57 was applied, as illustrated in (B) of FIG. 3, the first low-strength area 28*a* of the crushing section 27*a* started to be crushed in the forward-rearward direction. Subsequently, the first distortion section 55*a* started to be bent outward in accordance with crushing of the second low-strength area 28*b*, and the second distortion section 55*b* started to be bent inward in accordance with crushing of the third low-strength area 28*c*. As illustrated in (C) of FIG. 3, when the high-strength areas 29 in front of and behind the second low-strength area 28*b* and the high-strength areas 29 in front of and behind the third low-strength area 28*c* came into contact with each other, crushing of the first distortion section 55*a* and the second distortion section 55*b* was curbed, whereas crushing of the crushing section 27*a* was promoted.

As illustrated in (D) of FIG. 3, when the first low-strength area 28*a* was completely crushed, crushing of the first distortion section 55*a* and the second distortion section 55*b* and crushing of the fourth low-strength area 28*d* of the third distortion section 55*c* proceeded. At this time, in the first distortion section 55*a*, the second distortion section 55*b*, and the third distortion section 55*c*, since the ridgelines on the outer side and the ridgelines on the inner side weakened to have a low strength were alternately disposed in the forward-rearward direction, the first distortion section 55*a*, the second distortion section 55*b*, and the third distortion section 55*c* did not expand in the lateral direction but began to be crushed in the forward-rearward direction.

As illustrated in (E) of FIG. 3, the high-strength areas 29 between the crushing section 27*a* and the first distortion section 55*a* began to incline in the forward-rearward direction in accordance with crushing of the first distortion section 55*a*, the second distortion section 55*b*, and the third distortion section 55*c*. The high-strength areas 29 began to be crushed between the crushing section 27*a* and the first distortion section 55*a* in accordance with the inclining. As illustrated in (F) of FIG. 3, in this manner, the rear side member 12 could be crushed throughout the whole area in the forward-rearward direction. It was confirmed that an impact of a collision was significantly absorbed.

Figure 4:
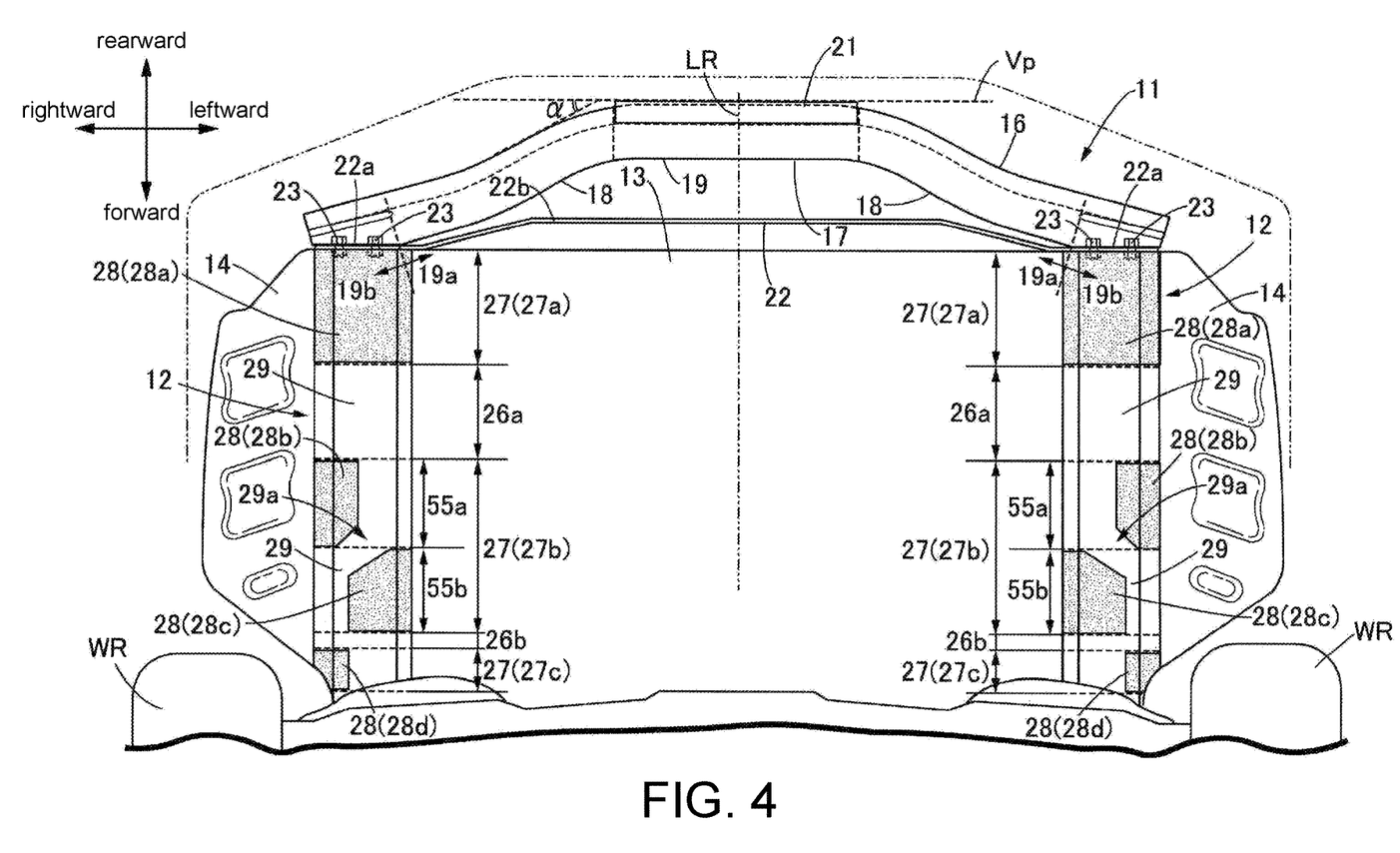
FIG. 4 is a plan view of a structure of a rear part of a vehicle body according to a second embodiment of the disclosure.

FIG. 4 schematically illustrates a structure of a rear part of a vehicle body according to a second embodiment of the disclosure. In this second embodiment, the crushing section 27*a* expands forward from the rear end of the rear side member 12. The high-strength areas 29 between the crushing section 27*a* and the coupling member 22 are omitted. As a result, deformation of the vehicle body 11 can be minimized from the rear end of the rear side member 12 at the time of a collision. The constitution is otherwise similar to that of the first embodiment described above.

Figure 5:
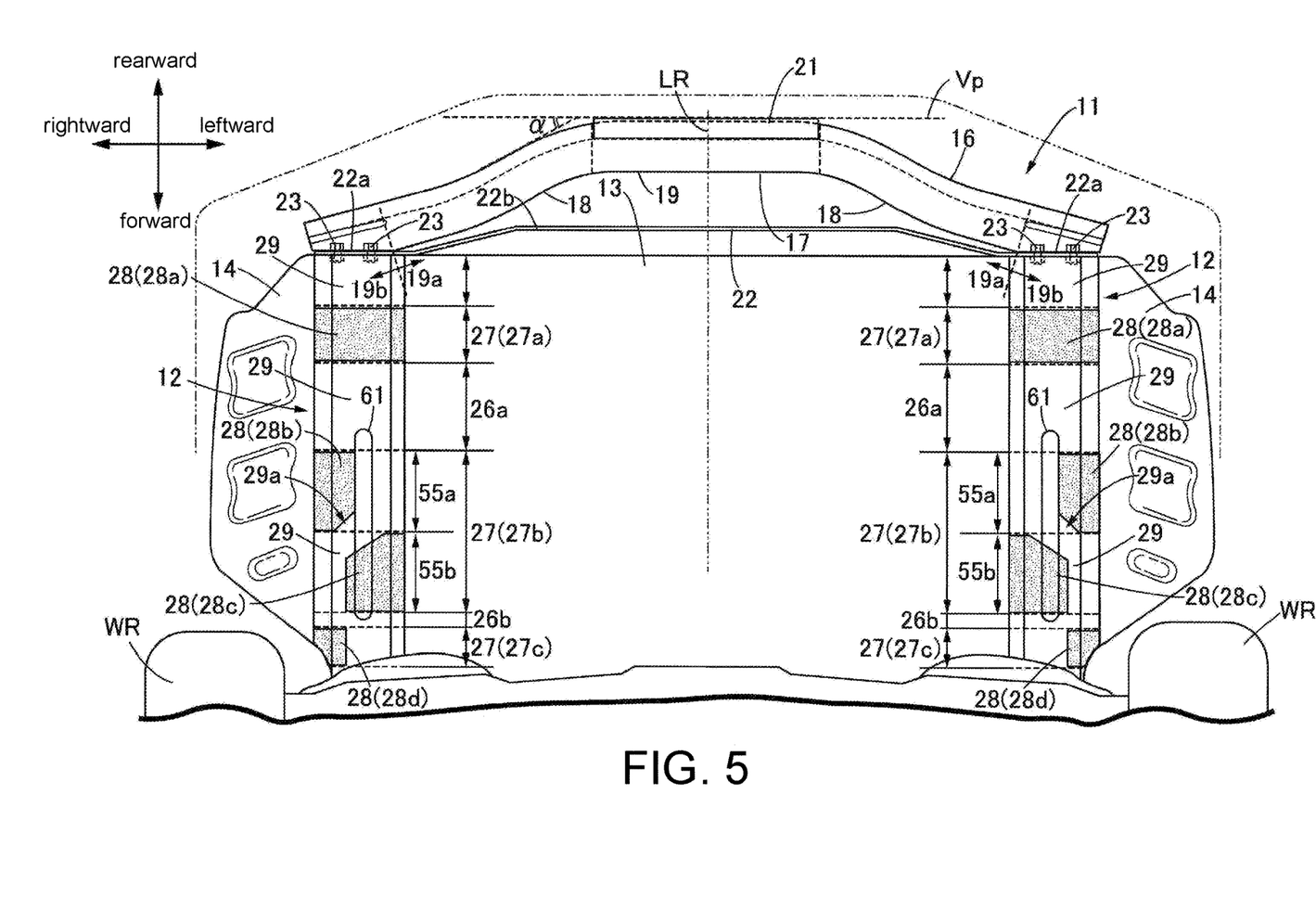
FIG. 5 is a plan view of a structure of a rear part of a vehicle body according to a modification example.

Further, as illustrated in FIG. 5, the rear side members 12 may have a bead 61 extending in a manner of intersecting the first distortion section and the second distortion section in the vehicle body forward-rearward direction along an axis at the center in a vehicle width direction. According to such a bead, a bending rigidity of the rear side members 12 in a vertical direction can be enhanced. Therefore, distortion in the lateral direction can be promoted. In this manner, the absorption amount of impact energy can be efficiently enhanced.

According to a first aspect, when a collision load acts from the front or the rear, the open ends of the side frames are restricted by the coupling member in a direction in which the open ends are away from each other. Therefore, a load in the lateral direction being applied to each of the side frames can be curbed. A collision load acting on each of the side frames in the forward-rearward direction can be regulated. Furthermore, the low-strength section of the side frame closer to the open end of the side frame has a lower strength in the forward-rearward direction. Therefore, the low-strength sections begin to be crushed from the open end side in accordance with a load acting in the forward-rearward direction. In this manner, an absorption amount of collision energy absorbed by the side frames can be increased. An impact of a collision can be favorably absorbed.

According to a second aspect, a collision load acts on the bumper beam from the intermediate body even at the time of an offset collision. A collision load can be favorably allotted to the left and right side frames from the bumper beam. In this manner, an offset collision can be favorably supported by the left and right side frames. At this time, the coupling member prevents the left and right side frames from being deformed in a direction in which they are away from each other. Therefore, deformation of the bumper beam can be curbed.

According to a third aspect, when a collision load acts on the side frames, the low-strength section closest to the open end can be crushed first in the vehicle body forward-rearward direction. In this manner, if collision energy is absorbed simply through initial crushing, deformation of the vehicle body can be minimized.

According to a fourth aspect, the low-strength areas can be easily established by simply controlling a temperature for each region of a metal plate material at the time of hot stamp forming.

According to a fifth aspect, deformation of the vehicle body can be minimized.

According to a sixth aspect, since the ridgelines on the outer side are weakened to have a low strength in the first distortion section, the side frames are distorted outward. Since the ridgelines on the inner side are weakened to have a low strength in the second distortion section, the side frames are distorted inward. The side frames can be significantly crushed in the vehicle body forward-rearward direction due to a combination of these distortions. An impact of a collision can be significantly absorbed.

According to a seventh aspect, even if the first one side low-strength area and the second one side low-strength area become close to each other in the forward-rearward direction, the high-strength areas can be secured. Crushing of the large crushing section can be secured. Absorption of a significant impact can be secured. Since the first one side low-strength area and the second one side low-strength area are not integrally crushed, the side frame can be deformed in order from the open end without having a lower strength than the low-strength section closer to the open end.

According to an eighth aspect, the first one side low-strength area and the second one side low-strength area can be easily established by simply controlling a temperature for each region of a metal plate material at the time of hot stamp forming.

According to a ninth aspect, when a collision load acts on the side frames, weld peeling of the first flanges and the second flanges welded to each other can be curbed.

According to a tenth aspect, since a bending rigidity of the side frame in a vertical direction can be enhanced, distortion in the lateral direction can be promoted. In this manner, the absorption amount of impact energy can be efficiently enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle body comprising:
    left and right side frames that extend in a vehicle body forward-rearward direction and support a collision load acting from a front or a rear; and
    a coupling member that is joined to open ends of the side frames and restricts displacement between the open ends in a direction in which the open ends are away from each other,
    wherein the side frame comprises a plurality of low-strength sections disposed with high-strength sections interposed therebetween in the vehicle body forward-rearward direction and having a lower strength than the high-strength sections in the vehicle body forward-rearward direction, and
    wherein the low-strength sections closer to the open end has a lower strength in the forward-rearward direction,
    wherein the low-strength sections comprise a crushing section which is disposed closest to the open end and weakens inner ridgelines of the side frames and outer ridgelines of the side frames to have a low strength, and
    wherein low-strength areas weakening the inner ridgelines and the outer ridgelines to have a low strength are formed of a softer metal plate material than high-strength areas in accordance with temperature control during hot stamp forming.

2. The vehicle body according to claim 1 further comprising:
    a bumper beam that comprises an intermediate body linearly extending in a lateral direction from a center in the lateral direction, and inclined bodies respectively connecting the open ends of the side frames to both ends of the intermediate body and inclining in a manner of being away from the open ends as the inclined bodies go toward the intermediate body from the open ends.

3. The vehicle body according to claim 2,
    wherein the side frame comprises
    a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other, and
an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

4. The vehicle body according to claim 1,
wherein the crushing section expands from the open end.

5. The vehicle body according to claim 4,
wherein the side frame comprises
a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other, and
an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

6. The vehicle body according to claim 1,
wherein the low-strength sections comprises a large crushing section which is disposed away from the crushing section with a gap therebetween in the vehicle body forward-rearward direction and in which a first distortion section weakening the ridgelines on the outer side to have a low strength and a second distortion section weakening the ridgelines on the inner side to have a low strength are alternately arranged in the forward-rearward direction.

7. The vehicle body according to claim 6,
wherein a linear high-strength area inclining and extending in the lateral direction is demarcated between a first one side low-strength area weakening the outer ridgelines to have a low strength in the first distortion section and a second one side low-strength area weakening the inner ridgelines to have a low strength in the second distortion section.

8. The vehicle body according to claim 7, wherein the first one side low-strength area and the second one side low-strength area are foinied of a softer metal plate material than high-strength areas in accordance with temperature control during hot stamp forming.

9. The vehicle body according to claim 8,
wherein the side frame comprises
a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other, and
an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

10. The vehicle body according to claim 7,
wherein the side frame comprises
a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other, and
an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

11. The vehicle body according to claim 7,
wherein the side frame has a bead extending in a manner of intersecting the first distortion section and the second distortion section in the vehicle body forward-rearward direction along an axis at a center in a vehicle width direction.

12. The vehicle body according to claim 6,
wherein the side frame comprises
a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other, and
an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

13. The vehicle body according to claim 6,
wherein the side frame has a bead extending in a manner of intersecting the first distortion section and the second distortion section in the vehicle body forward-rearward direction along an axis at a center in a vehicle width direction.

14. The vehicle body according to claim 1,
wherein the side frame comprises
a lower member which has left and right first flanges extending in the vehicle body forward-rearward direction and at least partially formed of a softer metal plate material than high-strength areas in accordance with temperature control during hot stamp forming, and partitions a first space extending in the forward-rearward direction using a plate material connecting the first flanges to each other, and an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

15. A vehicle body comprising:
left and right side frames that extend in a vehicle body forward-rearward direction and support a collision load acting from a front or a rear; and
a coupling member that is joined to open ends of the side frames and restricts displacement between the open ends in a direction in which the open ends are away from each other,
wherein the side frame comprises a plurality of low-strength sections disposed with high-strength sections interposed therebetween in the vehicle body forward-rearward direction and having a lower strength than the high-strength sections in the vehicle body forward-rearward direction, and
wherein the low-strength sections closer to the open end has a lower strength in the forward-rearward direction,
wherein the side frame comprises
a lower member which has left and right first flanges extending in the vehicle body forward-rearward direction and at least partially foiined of a softer metal plate material than high-strength areas in accordance with temperature control during hot stamp forming, and partitions a first space extending in the forward-rearward direction using a plate material connecting the first flanges to each other, and
an upper member which has left and right second flanges extending in the vehicle body forward-rearward direction, welded to the first flanges, and at least partially formed of a softer metal plate material than high-strength areas in accordance with temperature control during hot stamp forming, and partitions a second space extending in the forward-rearward direction and united with the first space using a plate material connecting the second flanges to each other.

* * * * *